United States Patent
Rodriguez et al.

(10) Patent No.: US 9,462,268 B2
(45) Date of Patent: Oct. 4, 2016

(54) OUTPUT MANAGEMENT OF PRIOR DECODED PICTURES AT PICTURE FORMAT TRANSITIONS IN BITSTREAMS

(71) Applicant: Cisco Technology, Inc., San Jose, CA (US)

(72) Inventors: Arturo A. Rodriguez, Norcross, GA (US); Anil Kumar Katti, Atlanta, GA (US); Hsiang-Yeh Hwang, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 504 days.

(21) Appl. No.: 14/050,276

(22) Filed: Oct. 9, 2013

(65) Prior Publication Data
US 2014/0098853 A1    Apr. 10, 2014

Related U.S. Application Data

(60) Provisional application No. 61/711,245, filed on Oct. 9, 2012.

(51) Int. Cl.
*H04N 19/115* (2014.01)
*H04N 19/169* (2014.01)
*H04N 21/44* (2011.01)

(52) U.S. Cl.
CPC ........ *H04N 19/0006* (2013.01); *H04N 19/115* (2014.11); *H04N 19/169* (2014.11); *H04N 21/44004* (2013.01); *H04N 21/44016* (2013.01)

(58) Field of Classification Search
CPC .................................................. H04N 19/169
See application file for complete search history.

(56) References Cited

U.S. PATENT DOCUMENTS

| 2014/0098896 A1 | 4/2014 | Wang |
| 2014/0098897 A1 | 4/2014 | Rodriguez et al. |
| 2015/0131744 A1 | 5/2015 | Samuelsson et al. |

OTHER PUBLICATIONS

U.S. Appl. No. 14/050,304, filed Oct. 9, 2013 entitled "Providing a Common Set of Parameters for Sub-Layers of Coded Video," Inventor: Rodriquez et al.
U.S. Appl. No. 14/050,304, filed Oct. 9, 2013 entitled "Providing a Common Set of Parameters for Sub-Layers of Coded Video," Inventor: Rodriguez et al.
International Search Report and Written Opinion mailed Dec. 9, 2013 in Application No. PCT/US2013/064180, 17 pages.

(Continued)

*Primary Examiner* — Young Lee
(74) *Attorney, Agent, or Firm* — Merchant & Gould P.C.

(57) ABSTRACT

Systems and methods may be provided for determining whether or not to output the "decoded pictures yet to be output" (DPYTBO) after decoding a random access point (RAP) picture of the second of two consecutive coded video sequences in a bitstream. The DPYTBO pictures may reside in a portion of memory coupled to a video decoder. The portion of memory may correspond to the Decoder Picture Buffer (DPB) of the video decoder. The picture resolution in the bitstream is allowed to change only at the start of a CVS. The first coded picture in a coded video sequence (CVS) may be a RAP picture. The second CVS may or may not have a picture resolution that is different from the picture resolution corresponding to the first CVS.

12 Claims, 7 Drawing Sheets

(56) References Cited

OTHER PUBLICATIONS

Rodriguez et al., "Semantics of no_output_of_prior_pics_flag," 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0316, Oct. 6, 2012, 5 pages.

Choi et al., "AHG9: NAL Unit Header Design for Base Spec," 11. JCT-VC Meeting; 102. MPEG Meeting Oct. 10, 2012-Oct. 19, 2012; Shanghai; (Joint Collaborative Teacm on Video Coding of ISO/IEC JTC1/SC29/WG11 and ITU-T SG.16); URL: http://wftp3.itu.int/av-arch/jctvc-site/, No. JCTVC-K0210, Oct. 2, 2012, 5 pages.

International Search Report dated Jan. 22, 2014 cited in Application No. PCT/US2013/064182, 11 pgs.

Ye-Kui Wang et al., "MV-HEVC/SHVC HLS: On VPS and SPS in HEVC 3DV and scalable extensions," Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, Document: JCT3V-D0047, URL: http://phenix.int-evry.fr/jct2/, XP030130711, pp. 1-22.

Rodriguez, "Introduction of temporal_id_type," Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, Document: JCTVC-K0330_r3, XP030055358, pp. 1-7.

Jill Boyce et al., "High level syntax hooks for future extensions," Joint Collaborative Team on Video Coding (JCT-VC) of ITU-T SG16 WP3 and ISO/IEC JTC1/SC29/WG11, 8th Meeting: San Jose, California, USA, Feb. 1-10, 2012, Document: JCTVC-H0388, XP030051788, pp. 1-8.

Ying Chen et al., "3D-HLS: Video parameter set for 3D-HEVC," Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, Document: JCT2-A0099, XP030130098, 15 pgs.

Ye-Kui Wang et al., "AHG9: On video parameter set," Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, Document: JCTVC-K0125, XP030113007, pp. 1-7.

European Office Action dated Feb. 15, 2016 cited in Application No. 13 779711.4, 7 pgs.

Choi et al., "Parameter set design for redundancy removal," Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, Document: JCTVC-M0165, XP030114122, pp. 1-5.

Ye-Kui Wang et al., "MV-HEVC/SHVC HLS: On VPS and SPS in HEVC 3DV and scalable extensions," Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, Document: JCT3V-D0047-v2, 25 pgs.

U.S. Office Action dated Apr. 29, 2016 cited in U.S. Appl. No. 14/050,304, 18 pgs.

OUTPUT MANAGEMENT OF PRIOR DECODED PICTURES AT PICTURE FORMAT TRANSITIONS IN BITSTREAMS

CROSS-REFERENCE TO RELATED APPLICATIONS

The present application claims the benefit of U.S. Provisional Patent Application No. 61/711,245 entitled "Output Management of Prior Decoded Pictures at Picture Format Transitions in Video Streams," filed on Oct. 9, 2012 and expressly incorporated herein, in its entirety, by reference.

TECHNICAL FIELD

The present disclosure relates generally to determining whether or not to output the "decoded pictures yet to be output" (DPYTBO) after decoding the random access point (RAP) picture of the second of two consecutive coded video sequences in a bitstream.

BACKGROUND

In systems that provide video programs such as subscriber television networks, the internet or digital video players, a device capable of providing video services or video playback includes hardware and software necessary to input and process a digital video signal to provide digital video playback to the end user with various levels of usability and/or functionality. The device includes the ability to receive or input the digital video signal in a compressed format, wherein such compression may be in accordance with a video coding specification, decompress the received or input digital video signal, and output the decompressed video signal. A digital video signal in compressed form is referred to herein as a bitstream that contains successive coded video sequences.

Digitally encoded video streams can be received by devices such as set-top boxes and televisions over a transmission channel of some type. During the output of the digitally encoded video stream a determination may be needed as to whether or not to output the "decoded pictures yet to be output" (DPYTBO) after decoding the RAP picture of the second of two consecutive coded video sequences in a bitstream.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

OVERVIEW

Figure 1:
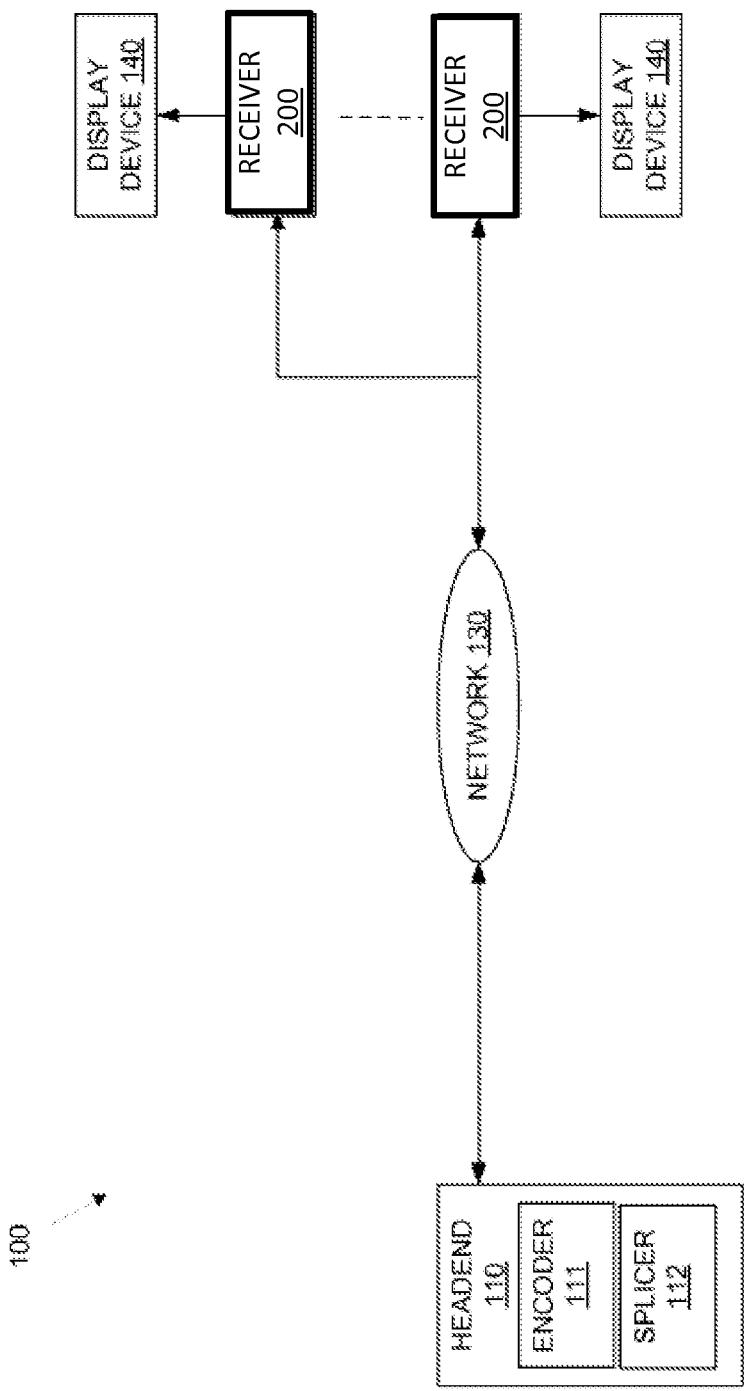
FIG. 1 is a high-level block diagram depicting an example environment in which embodiments of the present disclosure may be practiced.

Embodiments of the present disclosure describe a method for determining whether or not to output the "decoded pictures yet to be output" (DPYTBO) after decoding a random access point (RAP) picture of the second of two consecutive coded video sequences in a bitstream. The DPYTBO pictures may reside in a portion of memory coupled to a video decoder. The portion of memory may correspond to the Decoder Picture Buffer (DPB) of the video decoder. The picture resolution in the bitstream is allowed to change only at the start of a CVS. The first coded picture in a coded video sequence (CVS) may be a RAP picture. The second CVS may or may not have a picture resolution that is different from the picture resolution corresponding to the first CVS.

Description Of Example Embodiments

In systems that provide video programs such as subscriber television networks, the internet or digital video players, a device capable of providing video services or video playback includes hardware and software necessary to input and process a digital video signal to provide digital video playback to the end user with various levels of usability and/or functionality. The device includes the ability to receive or input the digital video signal in a compressed format, wherein such compression may be in accordance with a video coding specification, decompress the received or input digital video signal, such as a bitstream, and output the decompressed video signal. A digital video signal in compressed form is referred to herein as a bitstream that contains successive coded video sequences (CVSes).

The HEVC Specification, also known Rec. "ITU-T H.265" (published April 2013) is incorporated by reference. In some embodiments of the present disclosure, a bitstream may be received at the receiver. The bitstream may comprise successive CVSes, some having a first picture resolution, others having a second and different picture resolution. Two consecutive CVSes in the bitstream has pictures with the same sample aspect ratio but different picture resolutions such that the number of horizontal and vertical samples is different. Information corresponding to the sample aspect ratio and spatial span for the pictures in a CVS may be provided by one or more parameter sets, said parameter sets corresponding to the CVS. Each CVS in the bitstream may have a corresponding Sequence Parameter Set (SPS) that includes Video Usability Information (VUI). The VUI Information contains information that pertains to the sample aspect ratio. In one embodiment, a sample scale factor is determined and applied to the samples of the pictures in the corresponding CVS.

An encoder may provide one or more CVSes of the bitstream received by the receiver. Other network equipment, such as a splicer or Digital Program Inserter, may substitute portions of the bitstream with CVSes that have different picture resolutions and that may or may not have same sample aspect ratio.

In one method embodiment, a receive-and-process device may receive a bitstream of successive coded pictures and auxiliary information that respectively corresponds to each consecutive portion of the successive coded pictures of the bitstream. First auxiliary information corresponding to a first portion of the bitstream corresponds to a first implied spatial span for the successive coded pictures in the first portion. Second auxiliary information corresponding to a second portion of the bitstream corresponds to a second implied spatial span for the successive coded pictures in the second portion. The spatial span corresponds to the intended two-dimensional space occupied by the pictures, output by the video decoder. A first coded picture of the second portion of successive coded pictures of the bitstream is the first coded picture in the bitstream after a last coded picture of the first portion of successive coded pictures of the bitstream. The receiver decodes the received successive coded pictures of the first portion and outputs the decoded pictures in accordance with the first implied spatial span corresponding to the first auxiliary information. The receiver decodes the received successive coded pictures of the second portion and outputs the decoded pictures in accordance with the second implied spatial span corresponding to the second auxiliary information.

The no_output_of_prior_pics_flag specifies how the previously-decoded pictures in the decoded picture buffer are treated after decoding a RAP picture that starts a CVS, such as an IDR or BLA. The flag is included in the slice header of the RAP picture. If the picture resolution changes this flag can be inferred equal to one, regardless of the actual value of the flag provided in the slice header. In some embodiments, the picture resolution may change and the pictures in Decoded Picture Buffer (DPB) that have yet to be output need to be output. The number of frame buffers in the DPB is adjusted in discrete step sizes, such as in accordance with the HEVC specification. The number of frame buffers in the DPB is deterministic as expressed by co-pending U.S. patent application Ser. No. 13/937,209, which is hereby incorporated by reference in its entirety.

In one embodiment, changes between field coding and frame coding of interlaced video is only at the start of a CVS (i.e., since a new SPS is required to change the picture resolution). In such case, the value of the no_output_of_prior_pics_flag is not inferred but processed according to the flag value provided in the slice header of the corresponding RAP picture.

In a first type of CVS of the bitstream both the picture resolution and sample aspect ratio may change with respect to those in the immediately preceding CVS in the bitstream. In a second type of CVS of the bitstream the picture resolution changes but the sample aspect ratio does not change (i.e., remains the same) with respect to the respective values in the immediately preceding CVS in the bitstream. In the second type of CVS, all picture resolution changes may include both a change in horizontal picture size (i.e., the number of horizontal samples in the pictures) and a change in vertical picture size (i.e., the number of vertical samples in the pictures). In some embodiments of the present disclosure, a bitstream may contain at least one picture resolution change according to the second type of CVS but does not include at least one picture resolution change according to the first type of CVS in the bitstream. In alternate embodiments, a bitstream may contain at least one picture resolution change according to the second type of CVS and at least one picture resolution change according to the first type of CVS.

The picture resolution corresponding to a CVS may be provided by a sequence parameter set (SPS) that corresponds to the CVS. The SPS may be provided in the bitstream prior to the RAP picture of the corresponding CVS. An SPS may be as described in a video coding specification such as the HEVC Specification. The SPS may include parameters to determine "picture width in luma samples" and "picture height in luma samples", although it should be understood that the picture may contain chroma samples as well. These parameters may be provided as respective numeric values which may be multiplied by an integer number of luma samples to obtain the "picture width in luma samples" and "picture height in luma samples" values.

The slice header of each slice corresponding to a RAP picture that starts a CVS may include a flag that signals whether or not to output the DPYTBO pictures. For example, such RAP pictures may be IDR access units or BLA pictures. As a non-limiting example, the flag may be expressed as a "no_output_of_prior_pics_flag" to facilitate description of the method but it should be understood that in alternate embodiments it may be named differently.

In some embodiments, when a RAP picture does not correspond to the first picture of the second of two consecutive CVSes, the value of the no_output_of_prior_pics_flag is ignored. For instance, in HEVC such would be the case when a CVS (i.e., in this case, the second CVS) contains another RAP picture and the variable "NoRaslOutputFlag" is derived not equal to 1. The derivation of the variable "NoRaslOutputFlag" may be in accordance with the HEVC Specification.

In a first type of CVS of the bitstream, both the picture resolution and sample aspect ratio may change with respect to those in the immediately preceding CVS in the bitstream. In a second type of CVS of the bitstream, the picture resolution may change but the sample aspect ratio may not change (i.e., remains the same) with respect to the respective values in the immediately preceding CVS in the bitstream. All picture resolution changes may include both a change in horizontal picture size (i.e., the number of horizontal samples in the pictures) and a change in vertical picture size (i.e., the number of vertical samples in the pictures). In some embodiments, a bitstream may contain at least one picture resolution change according to the second type of CVS but does not include any first type of CVS in the bitstream. In alternate embodiments, a bitstream may contain at least one picture resolution change according to the second type of CVS and at least one picture resolution change according to the first type of CVS.

Each coded picture in the bitstream corresponds to an access unit that includes one or more NAL units, and at least one NAL unit included in the access unit corresponds to a slice (i.e., a coded slice) of the coded picture. Each NAL unit includes a header that contains a NAL unit type. Plural NAL unit types respectively correspond to different slice types. Some NAL unit types correspond to information other than coded slices. A coded picture may contain one or more coded slices. When a coded slice corresponds to the full picture resolution, the access unit corresponding to the coded picture contains only one coded slice. A RAP picture is an Intra coded picture (i.e. comprising only of coded Intra slices). Plural NAL unit types respectively correspond to plural types of RAP pictures. Some Intra pictures may not be RAP pictures. The NAL unit type of the RAP picture that starts a CVS identifies the type of RAP picture that corresponds to this RAP picture.

In some embodiments of the present disclosure, at least one of the plural types of RAP pictures does not correspond to the first coded picture of a second consecutive CVS. In alternate embodiments, each of the plural types of RAP pictures may correspond to the first coded picture of a second CVS.

In some embodiments of the present disclosure, a picture resolution change introduced by the second of two consecutive CVSes may only be allowed when the type of RAP picture corresponding to the second CVS is one from a set of types of RAP pictures, where the set excludes at least one of the plural types of RAP pictures. In an alternate embodiment, only one of the plural types of RAP pictures is excluded from being allowed to change the picture resolution in the second CVS.

In some embodiments of the present disclosure, if the first coded picture in a second CVS corresponds to an excluded type of RAP picture, the value of the no_output_of_prior_pics_flag is ignored in the one or more slice headers corresponding to the RAP picture.

In other embodiments, when a RAP picture does not correspond to the first picture of a second CVS, the slice header does not include the no_output_of_prior_pics_flag.

When the RAP picture of a second CVS introduces a change in picture resolution with respect to the first CVS, the slice header of each slice corresponding to the RAP provides the same value for the no_output_of_prior_pics_flag.

In one embodiment, a set of parameters derived from information provided in a parameter set corresponding to the second CVS, such as the SPS are examined to determine whether or not to output DPYTBO pictures. In an alternate embodiment, the set of parameters derived from information provided in a parameter set corresponding to the second CVS, such as the SPS are examined to determine whether or not to the no_output_of_prior_pics_flag is inferred. In yet another embodiment, the set of parameters derived from information provided in a parameter set corresponding to the second CVS, such as the SPS are examined to determine the method when the vaLUE OF THE no_output_of_prior_pics_flag MUst be read or inferred. The value of the flag determines whether or not to output DPYTBO pictures. In a first embodiment the set of derived parameters correspond to sample aspect ratio, sample scale factor, and output picture cropping rectangle. In a second embodiment the set of derived parameters correspond to sample aspect ratio and output picture cropping rectangle. In a third embodiment the set of derived parameters correspond to one or more from: sample aspect ratio, sample scale factor, and output picture cropping rectangle. The output cropping rectangle corresponds to the portion of the pictures in the CVS required for conformance.

The "sample" herein may be equivalent to a pixel, such as a luma sample or luma pixel. The output sequence of pictures provided to the display device may be derived from output pictures from the decoded picture buffer (i.e., decoded pictures), except when required to output blank pictures as described below.

Upon transitioning to a second CVS with a different picture resolution than the picture resolution associated with the first CVS, the determination on whether or not to output the DPYTBO pictures corresponding to the first CVS may be based on: 1) the value of the no_output_of_prior_pics_flag, and 2) the respective values of the following parameters derived or provided by the first and second SPS that respectively correspond to the first and second CVSes: a) picture width in luma samples, b) picture height in luma samples, c) sample aspect ratio, d) sample scale factor, and e) output picture cropping rectangle.

The sample aspect ratio corresponds to the width to height ratio of the luma samples of a decoded picture. For example, the sample aspect ratio may be typically equal to its derived value and an implied sample scale factor equal to one, except when the sample aspect ratio derived for the first CVS and second CVS of two consecutive CVSes have the same value, such as when switching between picture resolutions of 1280×720 and 1920×1080, both of which have square sample aspect ratios.

In alternate embodiments, the no_output_of_prior_pics_flag is provided in the NAL unit header for NAL unit types corresponding to the type of RAP pictures found in the second CVS. Here, the no_output_of_prior_pics_flag would neither be provided in the slice header nor in the header of other NAL unit types.

The sample aspect ratio is derived from information provided in a parameter set, such as in the VUI portion of the SPS. The sample scale factor is derived from information provided in a parameter set, such as in the VUI portion of the SPS. In one embodiment, the sample scale factor is inferred or derived equal to 1 unless the picture resolution of the second of two consecutive CVSes changes but the sample aspect ratio does not. The sample scale factor is a magnification or de-magnification factor that allows picture resolution changes across coded video sequences (CVSes) that have the same sample aspect ratio and picture aspect ratio but different picture resolutions, such as transitions between 1280×720 and 1920×1080 pictures. The derived sample scale factor allows a bitstream entered at a RAP picture to change picture resolution without changing the sample aspect ratio to maintain constant the spatial resolution of the sequence of pictures derived from output pictures from the decoded picture buffer.

The output picture cropping rectangle may defined by left, right, top, and bottom demarcations (pic_crop_left_offset, pic_crop_right_offset, pic_crop_top_offset, and pic_crop_bottom_offset, respectively) within the decoded luma picture. A parameter set such as the SPS provides these cropping parameters when a corresponding flag provided in a parameter set, such as in the VUI portion of the SPS indicates the presence of. The picture cropping parameters may be according to the value of corresponding flag.

In some embodiments, the cropping process may be applied on a decoded picture after the decoded picture has been scaled according to derived sample scale factor to obtain a derived final output picture corresponding to the respective decoded picture. The derived final output picture corresponds to a respective spatial span. In another embodiment, the cropping process may be first applied on a decoded picture prior to applying the derived sample scale factor to derive a corresponding final output picture. The picture resolution of the final output picture may be referred to as the final picture resolution. In one embodiment, if the derived final picture resolution changes from a first to a second CVS, the no_output_of_prior_pics_flag is inferred equal to 1. If it does not changed, the value of the flag is not inferred but according to the value provided in the slice header of the RAP picture corresponding to the second CVS. may be considered while determining whether or not to output DPYTBO pictures. When 1080 progressive scan pictures are coded as frames of 1088 lines and then scaled to output as 720 progressive lines. Similarly, in HEVC, the former embodiments may be applicable when a picture sequence stems from progressive content, separated into fields (e.g., with 3:2 pulldown) for output purposes, and subsequently coded as fields. In such case, a picture coded 544 lines may be scaled first and then cropped from 1088 to 1080 lines.

The maximum number of DPYTBO pictures allowed may depend on the size of the decoded picture buffer. In some embodiments, the no_output_of_prior_pics_flag is appropriately signaled when the size of the decoded picture buffer changes between the first CVS and the second CVS. The actual value of the no_output_of_prior_pics_flag is not inferred but rather provided for the RAP picture, such as in a slice header corresponding to the RAP picture.

To prevent underflow and/or overflow in a coded picture buffer (CPB) of the video decoder, when DPYTBO pictures may be discarded and not output, an equivalent number of consecutive blank pictures may be output in their place. The number of blank pictures may equal the number of DPYTBO pictures discarded and not output. Otherwise, overflow and/or underflow issues may manifest after accruing plural instances of first and second consecutive CVSes in which the DPYTBO pictures are discarded and not output.

On some embodiments, a first type of RAP picture corresponding to the second CVS may be an IDR picture. A second type of picture may correspond to an Intra picture corresponding to a CVS of a commercial or video content that is different than the video content corresponding to the first CVS. The second CVS may or may not change the picture format.

The picture format of the sequence of pictures presented and displayed on the display device coupled to the video decoder or receiver may be kept constant even when the picture resolution in the bitstream changes, such as during a commercial in broadcast applications.

FIG. 1 is a high-level block diagram depicting an example environment in which one or more embodiments of the present disclosure may operate. In particular, FIG. 1 is a block diagram that depicts an example video transmission system 100. In this example, the video transmission system 100 may include a headend 110 and one or more receivers 200. In some embodiments of the present disclosure, a receiver 200 may house a video decoder. Receiver 200 may be coupled to a communications network or storage device, and receives, acquires, or is provided a bitstream corresponding to a video signal. Receiver 200 may further contain an output video port coupled to a display device. Receiver 200 may set and provide an output video signal via the output video port upon receiving or acquiring a video program containing a bitstream (i.e., video stream). In some embodiments, the corresponding physical output clock of the video port coupled to the display device may be set and maintained constant upon the receiver acquiring or receiving the bitstream. Herein a bitstream may also be referred to as a video stream. In some embodiments, a video stream may be acquired by a receiver that tunes to a television channel providing video programs.

Receivers 200 and the headend 110 are coupled via a network 130. The headend 110 and the receivers 200 cooperate to provide a user with digital television services, including, for example, television programming, interactive program guide (IPG) services, video-on-demand (VOD), and pay-per-view, as well as other digital services such as music, Internet access, commerce (e.g., home-shopping), voice-over-IP (VoIP), and/or other telephone or data services.

A receiver 200 may be a stand-alone unit or integrated into another device such as, for example, a display device 140, a personal computer, personal digital assistant (PDA), mobile phone, among other devices. In other words, receiver 200 (also referred to herein as a digital receiver or processing device or digital home communications terminal (DHCT)) may comprise one of many devices or a combination of devices, such as a set-top box, television with communication capabilities, cellular phone, personal digital assistant (PDA), or other computer or computer-based device or system, such as a laptop and personal computer, among others. As set forth above, receiver 200 may be coupled to display device 140 (e.g., computer monitor, television set, etc.), or in some embodiments, may comprise an integrated display (with or without an integrated audio component).

Receiver 200 may receive signals (video, audio and/or other data) including digital video signals in a compressed representation of a digitized video signal such as, for example, HEVC bitstreams, from headend 110 through the network 130, and provides reverse information to headend 110 through the network 130. As explained further below, receiver 200 comprises, among other components, a video decoder and a reconfigurable decoded picture buffer (DPB).

Digital television services are presented via respective display devices 140, each which typically comprises a television set that, according to its type, is driven with an interlaced scan video signal or a progressive scan video signal. However, the display devices 140 may also be any other device capable of displaying video images including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or receiver 200. Although shown communicating with a display device 140, receiver 200 may communicate with other devices that receive, store, and/or process bitstreams from receiver 200, or that provide or transmit bitstreams or uncompressed video signals to receiver 200.

Headend 110 may include one or more server devices (not shown) for providing digital video, audio, and other types of media or data to client devices such as, for example, receiver 200. Headend 110 may receive content from sources external to headend 110 or the video transmission system 100 via a wired and/or wireless connection (e.g., satellite or terrestrial network), such as from content providers.

Headend 110 also includes one or more encoders (encoding devices or compression engines) 111 (one shown) and one or more video processing devices embodied as one or more splicers 112 (one shown) coupled to encoder 111. In some embodiments, encoder 111 and splicer 112 may be co-located in the same device and/or in the same locale (e.g., both in the headend 110 or elsewhere), while in some embodiments, encoder 111 and splicer 112 may be distributed among different locations within the video transmission system 100. For instance, though shown residing at headend 110, encoder 111 and/or splicer 112 may reside in some embodiments at other locations such as a hub or node.

Encoder 111 may provide one or more CVSes of the bitstream received by receiver 200. Other network equipment, such as splicer 112 or a Digital Program Inserter, may substitute portions of the bitstream with CVSes that have different picture resolutions and that may or may not have same sample aspect ratio.

Figure 2A:
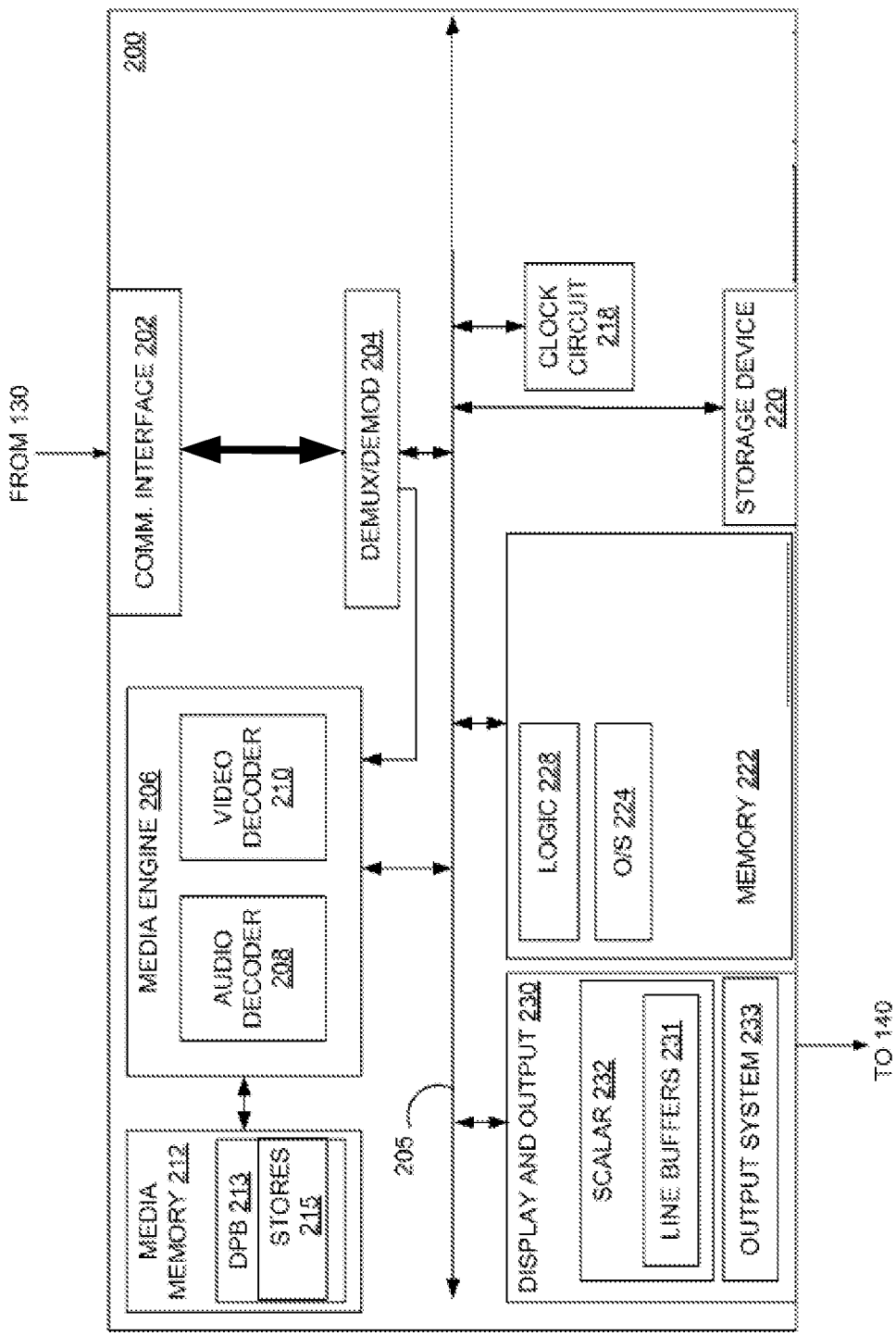
FIGS. 2A-2B are a block diagram of an embodiment of a receiver as depicted in FIG. 1 and related equipment, in which embodiments of the present disclosure may be implemented.

FIG. 2A is an example embodiment of select components of a receiver 200. It should be understood by one having ordinary skill in the art that receiver 200 shown in FIG. 2A is merely illustrative, and should not be construed as implying any limitations upon the scope of the disclosure.

Receiver 200 includes a communication interface 202 coupled to a multiplexing/demodulation system 204 (herein, simply demux 204 for brevity). Demux 204 may include MPEG-2 transport demultiplexing capabilities. When receiving a digital bitstream, demux 204 enables the separation of packets of data, corresponding to the desired video stream, for further processing.

Demux 204 is coupled to a bus 205 and to a media engine 206. The media engine 206 comprises, in one embodiment, decoding logic comprising one or more of a respective audio decoder 208 and video decoder 210. The media engine 206 is further coupled to the bus 205 and to a media memory 212, the latter which, in one embodiment, comprises one or more respective buffers for temporarily storing compressed (compressed picture buffer or bit buffer, not shown) and/or reconstructed pictures (decoded picture buffer or DPB 213). The DPB 213 includes multiple stores 215, the quantity of which is configured and fixed for a currently viewed channel in advance of receiving pictures from a bitstream. In some embodiments, one or more of the buffers of the media memory 212 may reside in other memory (e.g., memory 222, explained below) or components.

Receiver 200 further comprises additional components coupled to the bus 205 (though shown as a single bus, one or more buses are contemplated to be within the scope of the embodiments). For instance, receiver 200 further comprises a clock circuit 218 comprising phase and/or frequency locked-loop circuitry to lock into a system time clock (STC) from a program clock reference, or PCR, received in the video stream to facilitate decoding and output operations. Explicit PTS/DTS values and extrapolated values (for PTS and DTS) are compared to the reconstructed STC (generated by the clock circuit 218) to assist a determination of when the buffered compressed pictures are provided to the video decoder 210 for decoding (DTS) and when the buffered, decoded pictures are output by the video decoder 210 (PTS) to display and output logic 230 for processing and subsequent presentation on a display device 140. In some embodiments, clock circuit 218 may comprise plural (e.g., independent or dependent) circuits for respective video and audio decoding operations and output processing operations. Although described in the context of hardware circuitry, some embodiments of clock circuit 218 may be configured as software (e.g., virtual clocks) or a combination of hardware and software. Further, in some embodiments, clock circuit 218 is programmable.

Receiver 200 may further comprise a storage device 220 (and associated control logic as well as one or more drivers in memory 222) to temporarily store buffered media content and/or more permanently store recorded media content. Storage device 220 may be coupled to bus 205 via an appropriate interface (not shown), as should be understood by one having ordinary skill in the art. Memory 222 in receiver 200 comprises volatile and/or non-volatile memory, and is configured to store executable instructions or code associated with an operating system (O/S) 224 and other applications.

Receiver 200 is further configured with display and output logic 230, as indicated above, which includes a scalar 232, line buffers 231, and one or more output systems (e.g., configured as HDMI, DENC, or others well-known to those having ordinary skill in the art) 233 to process the decoded pictures and provide for presentation (e.g., display) on display device 140. In some embodiments, scalar 232 may be configured as one or more sample rate converters.

Figure 2B:
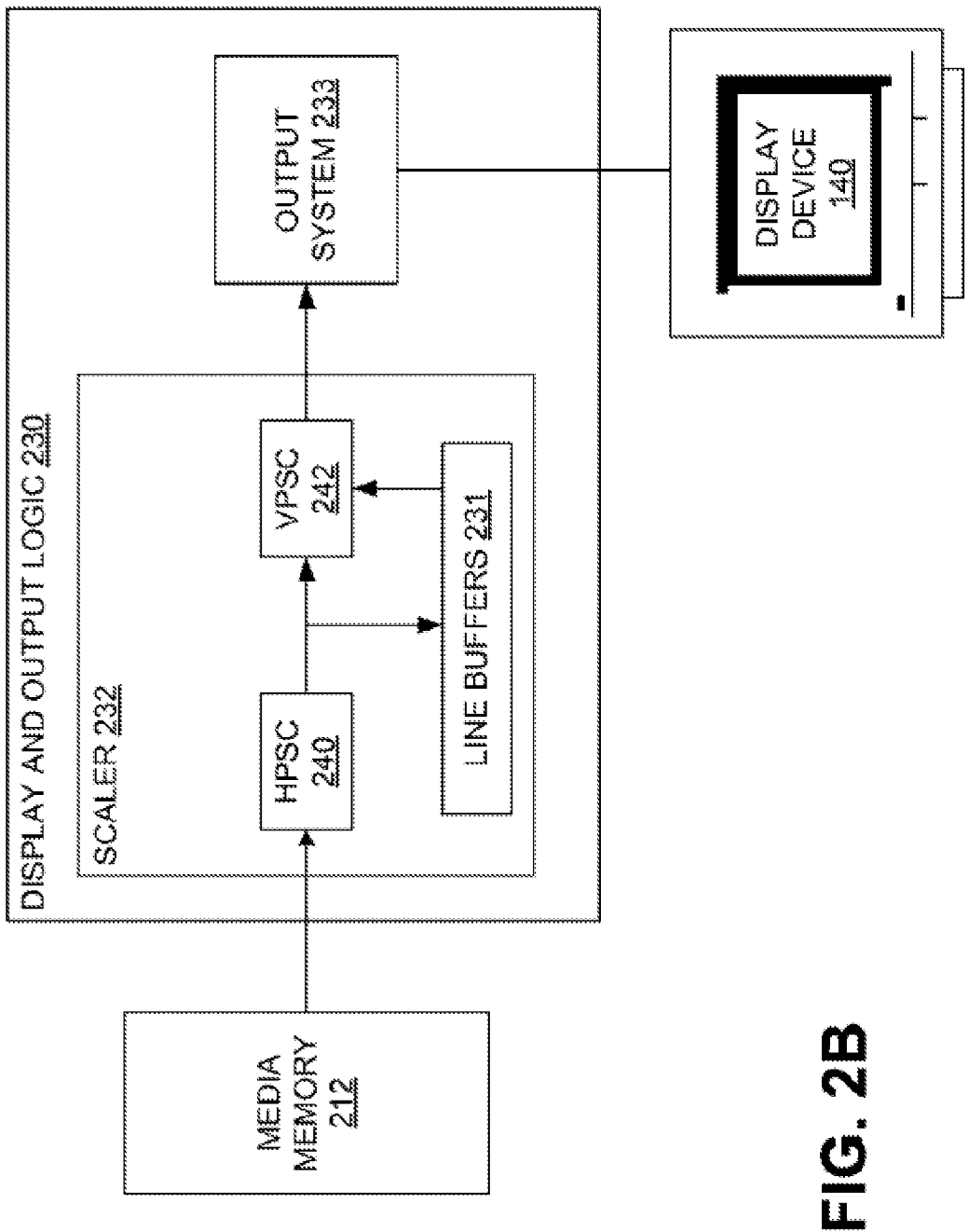

FIG. 2B shows a block diagram of one embodiment of display and output logic 230. It should be understood by one having ordinary skill in the art that display and output logic 230 shown in FIG. 2B is merely illustrative, and should not be construed as implying any limitations upon the scope of the disclosure. For instance, in some embodiments, display and output logic 230 may comprise a different arrangement of the illustrated components and/or additional components not shown, including additional memory, processors, switches, clock circuits, filters, and/or samplers, graphics pipeline, among other components as should be appreciated by one having ordinary skill in the art in the context of the present disclosure.

Further, though shown conceptually in FIG. 2A as an entity separate from the media engine 206, in some embodiments, one or more of the functionality of the display and output logic 230 may be incorporated in the media engine 206 (e.g., on a single chip) or elsewhere in some embodiments. As explained above, the display and output logic 230 comprises in one embodiment scalar 232 and one or more output systems 233 coupled to scalar 232 and the display device 140.

Scalar 232 may comprise a display pipeline including Horizontal Picture Scaling Circuit (HPSC) 240 configured to perform horizontal scaling, and a Vertical Scaling Picture Circuit (VPSC) 242 configure to perform vertical scaling. In one embodiment, the input of VPSC 242 is coupled to internal memory corresponding to one or more line buffers 231, which are connected to the output of HPSC 240. Line buffers 231 serve as temporary repository memory to effect scaling operations.

In one embodiment, under synchronized video timing and employment of internal FIFOs (not shown), reconstructed pictures may be read from the DPB and provided in raster scan order, fed through the scalar 232 to achieve horizontal and/or vertical scaling, and the scaled pictures are provided (e.g., in some embodiments through an intermediary such as a display buffer located in media memory 212) to an output port 233 according to the timing of a physical clock (e.g., in clock circuit 218 or elsewhere) driving the output system 233. In some embodiments, vertical downscaling may be implemented by neglecting to read and display selected video picture lines in lieu of processing by VPSC 242. In some embodiments, upon a change in the vertical resolution of the picture format, vertical downscaling may be implemented to all, for instance where integer decimation factors (e.g., 2:1) are employed, by processing respective sets of plural lines of each picture and converting them to a corresponding output line of the output picture.

One having ordinary skill in the art should understand that receiver 200 may include other components not shown, including decryptors, samplers, digitizers (e.g., analog-to-digital converters), multiplexers, conditional access processor and/or application software, driver software, Internet browser, among others. Further, though the logic 228 is illustrated as residing in memory 222, it should be understood that all or a portion of such logic 228 may be incorporated in, or distributed among, the media engine 206, the display and output system 230, or elsewhere. Similarly, in some embodiments, functionality for one or more of the components illustrated in, or described in association with, FIG. 2A may be combined with another component into a single integrated component or device.

In one embodiment, under synchronized video timing and employment of internal FIFOs (not shown), reconstructed pictures may be read from the DPB, fed through the scalar 232 to achieve the horizontal and/or vertical scaling necessary to effect the same planar span as implied by a first-type CVS or by a second-type CVS.

As one example of an implementation using derived values of sample aspect ratio, sample scale factor, and picture resolution to provide the picture format corresponding for the dominant output picture format and the implied spatial span, consider a picture format of 1920×1080 signaled as the main output picture format and alternate picture format corresponds to 1280×720. The sample scale factor corresponding to the 1280×720 portion of the bitstream is derived by the receiver logic to output both picture resolutions when each is received as a continuous 1920×1080 pictures. The 1280×720 pictures undergo decoding and are upscaled to be presented for display at 1920×1080. The display and output logic 230 accesses the decoded pictures from media memory 212 and upscales the decoded pictures to 1920×1080 (through the scalar 232 of the display pipeline) without tearing down the clock (e.g., pixel output clock) to maintain constant the 2D size and aspect ratio of the spatial span implied by the output pictures of the CVSes.

Figure 3A:
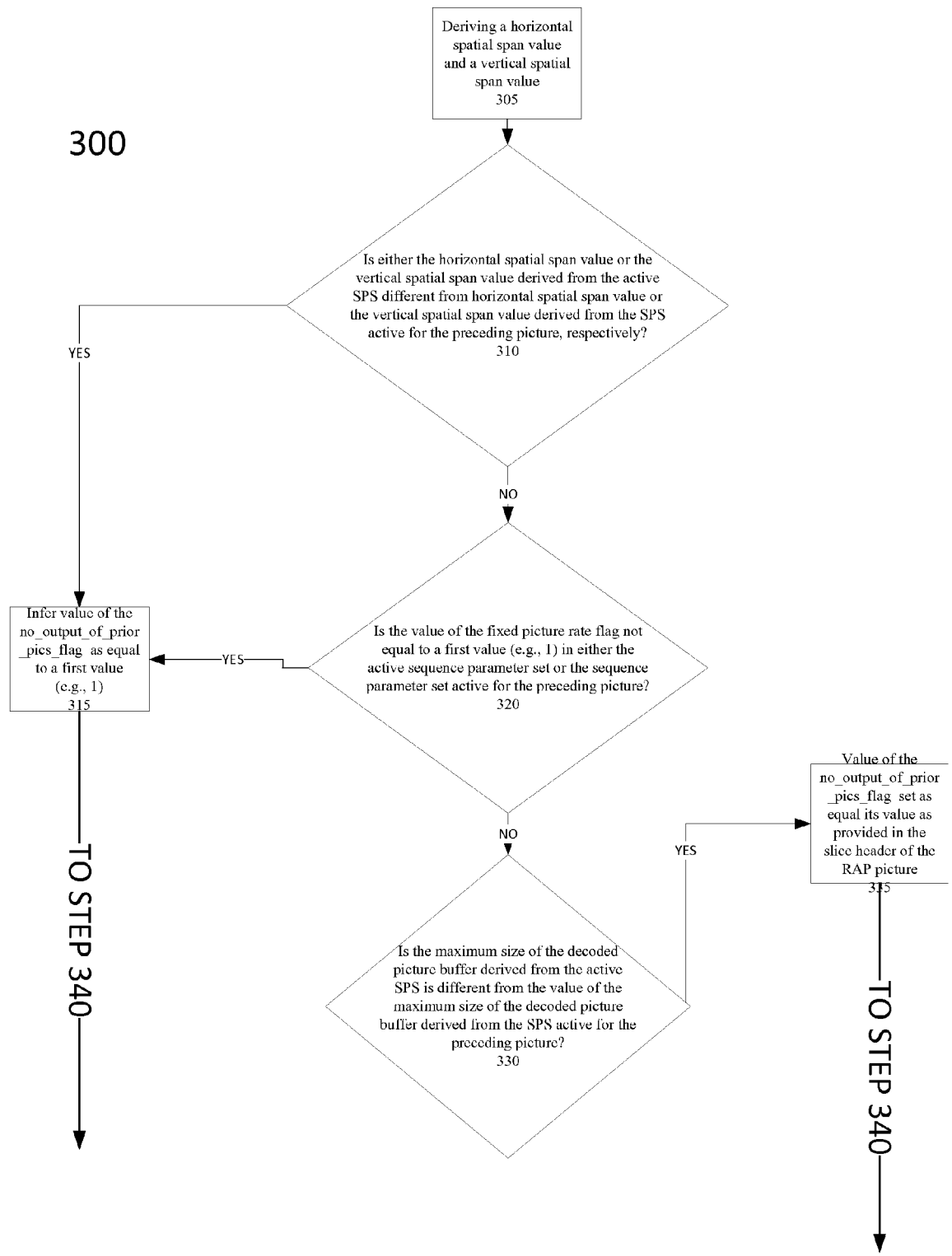
FIGS. 3A-3B are a flowchart illustrating embodiments of the present disclosure.
Figure 3B:
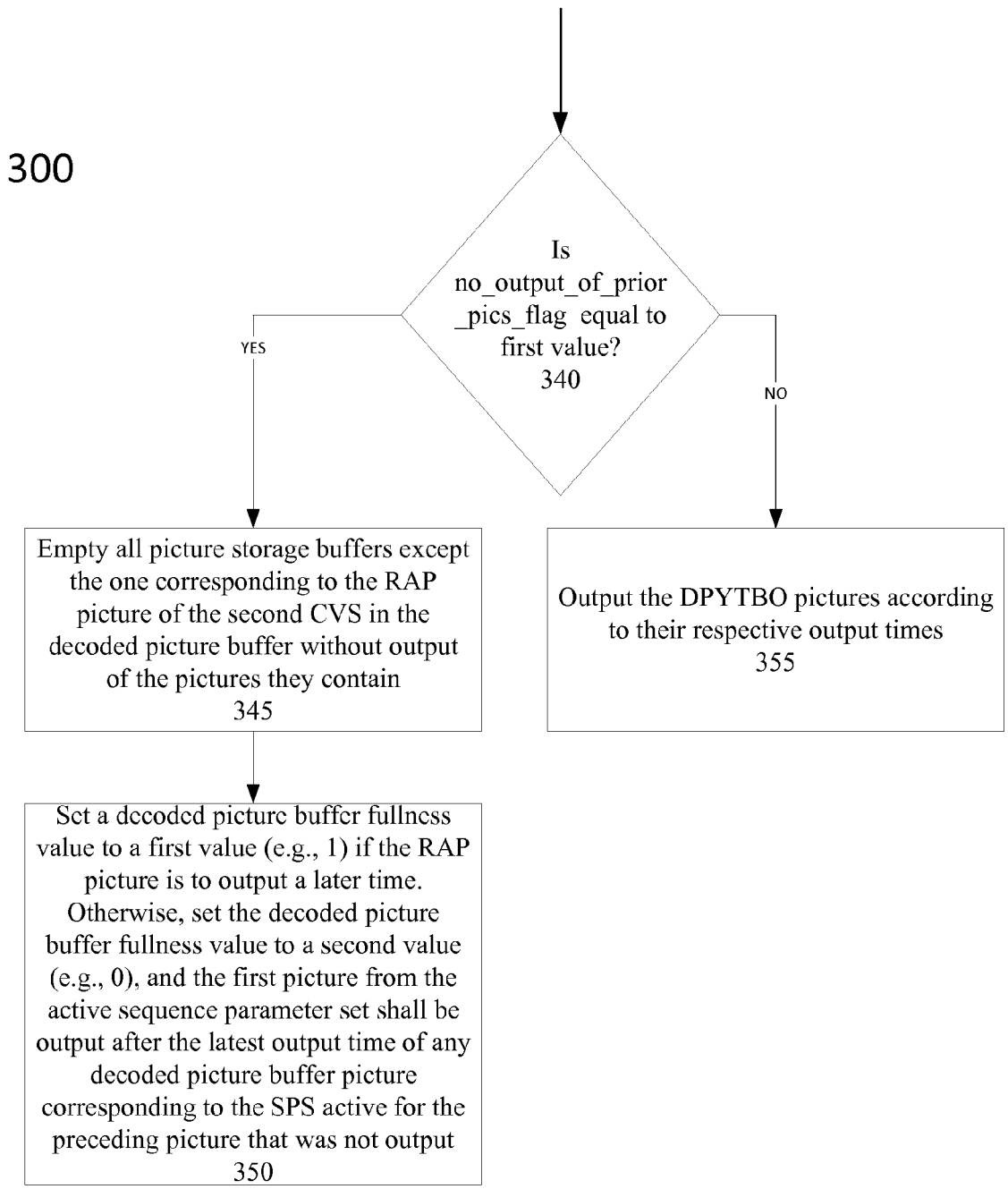

FIGS. 3A-3B illustrate a flowchart embodying methods of the present disclosure. Method 300 is a method for determining the value of the no_output_of_prior_pics_flag when the fixed picture rate flag value is allowed to change. Method 300 is a method of determining the value of the no_output_of_prior_pics_flag at the second CVS of two consecutive CVSes, where an active bitstream may include CVSes with a fixed picture rate and without a fixed picture rate, as indicated by the value of a fixed picture rate flag in the SPS of the corresponding CVS. Method 300 may begin at step 305 where a horizontal spatial span value and a vertical spatial span value may be derived. For example, the horizontal spatial span value may be derived as an output picture width in luma samples value adjusted by a sample aspect ratio and a derived sample scale factor. The vertical spatial span value may be derived as an output picture height in luma samples value adjusted by the derived sample scale factor.

The output picture width in luma samples value ("output_pic_width_in_luma_samples" in the SPS) and the output picture height in luma samples value ("output_pic_heigth_in_luma_samples" in the SPS) may specify the samples of possibly cropped output pictures. Such cropped pictures may be derived by applying the cropping process (described below) to each picture output from the DPB according to the cropping parameters provided in the SPS of the corresponding CVS. The picture resolution of the decoded pictures is according to the values "pic_width_in_luma_samples" or "pic_height_in_luma_sample" as provided in the SPS.

Cropping may be effected according to a corresponding set of provided values corresponding to a cropping rectangle, such as, left, right, top, and bottom demarcations ("pic_crop_left_offset", "pic_crop_right_offset", "pic_crop_top_offset", and "pic_crop_bottom_offset", respectively) for the cropping rectangle as applied to the decoded luma picture that has width and height (in number of luma samples), such as may be provided by pic_width_in_luma_samples and pic_height_in_luma_samples. The SPS may provide these cropping parameters when a corresponding flag in the SPS indicates the presence of the picture cropping parameters according to a first value (e.g. =1).

Alternatively in other embodiments, the cropping parameters may be inferred, such as from picture width and height values that are close to a particular picture resolution that is widely used. Inferred cropping parameters may correspond to the top-left-most, top-most or left-most rectangle of the decoded picture specified by the values of picture width and height in luma samples. For instance, the cropping rectangle functionality application to a CVS with 1920×1088 picture resolution may result in derived output pictures with 1920×1080 picture resolution.

The sample scale factor is derived from information provided in a parameter set, such as in the VUI portion of the SPS. The sample scale factor allows picture resolution changes across CVSes that have the same sample aspect ratio and picture aspect ratio but different picture resolutions, such as transitions between 1280×720 and 1920×1080 pictures. The sample scale factor may allow entering a bitstream at any RAP while maintaining constant the spatial resolution of the sequence of pictures derived from output DPB pictures. The sample aspect ratio may correspond to the width to height ratio of the luma samples of the decoded picture.

When a bitstream corresponding to interlaced video is coded as fields in a CVS, each decoded field may be understood to have a physical vertical span that is twice as large since each lines of the field corresponds to the alternate lines of the overall frame. Switching between field and frame coding is only at a new CVS (i.e., since a new SPS is required to change the picture resolution), the value of the no_output_of_prior_pics_flag is not inferred but as provided in the slice header of the RAP picture.

Method 300 may proceed to step 310 where it may be determined if either the horizontal spatial span value or the vertical spatial span value derived from the active SPS is different from the value of horizontal spatial span value or the vertical spatial span value derived from the SPS active for the preceding picture, respectively.

If at step 310 it is determined that either the horizontal spatial span value or the vertical spatial span value derived from the active SPS is different from the value of horizontal spatial span value or the vertical spatial span value derived from the SPS active for the preceding picture, method 300 may proceed to step 315 where the value of the no_output_of_prior_pics_flag may be inferred as equal to a first value (e.g., 1).

If at step 310 it is determined that neither the horizontal spatial span value nor the vertical spatial span value derived from the active SPS is different from the value of horizontal spatial span value or the vertical spatial span value derived from the SPS active for the preceding picture, method 300 may proceed to step 320 where it may be determined if the value of the fixed picture rate flag is not equal to a first value (e.g., 1) in either the active sequence parameter set or the sequence parameter set active for the preceding picture.

If at step 320 it is determined that the value of the fixed picture rate flag is not equal to a first value (e.g., 1) in either the active sequence parameter set or the sequence parameter set active for the preceding picture, method 300 may proceed to step 315 where the value of the no_output_of_prior_pics_flag may be inferred equal to the first value (e.g., 1).

If at step 320 it is determined that the value of the fixed picture rate flag is equal to the first value (e.g., 1) in either the active sequence parameter set or the sequence parameter set active for the preceding picture, method 300 may proceed to step 330 where it may be determined that the maximum size of the decoded picture buffer ("sps_max_dec_pic_buffering" [sps_max_temporal_layers_minus1] derived from the active SPS is different from the value of the maximum size of the decoded picture buffer derived from the SPS active for the preceding picture. It should be understood that in some embodiments of the present disclosure, step 330 may be optional.

If at step 330 it is determined that the maximum size of the decoded picture buffer derived from the active SPS is different from the value of the maximum size of the decoded picture buffer derived from the SPS active for the preceding picture the value of the no_output_of_prior_pics_flag shall not be inferred and method 300 may proceed to step 335.

At step 335 the value of the no_output_of_prior_pics_flag will be determined as equal to its value as provided in the slice header of the RAP picture. Once the value of the no_output_of_prior_pics_flag is determined, method 300 proceeds to step 345 at step 340 if the no_output_of_prior_pics_flag value is the first value (e.g., 1). At step 345, all picture storage buffers except the one corresponding to the RAP picture of the second CVS in the decoded picture buffer may be emptied without output of the pictures they contain.

Method 300 may then advance to step 350, where a decoded picture buffer fullness value may be set to a first value (e.g., 1) if the RAP picture is to output a later time. Otherwise, the decoded picture buffer fullness value may be set to a second value (e.g., 0), and the first picture from the active sequence parameter set shall be output after the latest output time of any decoded picture buffer picture corresponding to the SPS active for the preceding picture that was not output.

Once the value of the no_output_of_prior_pics_flag is determined, method 300 proceeds to step 355 if the no_output_of_prior_pics_flag value is the second value (e.g., 0). At step 355, the DPYTBO pictures may be output according to their respective output times.

Figure 4A:
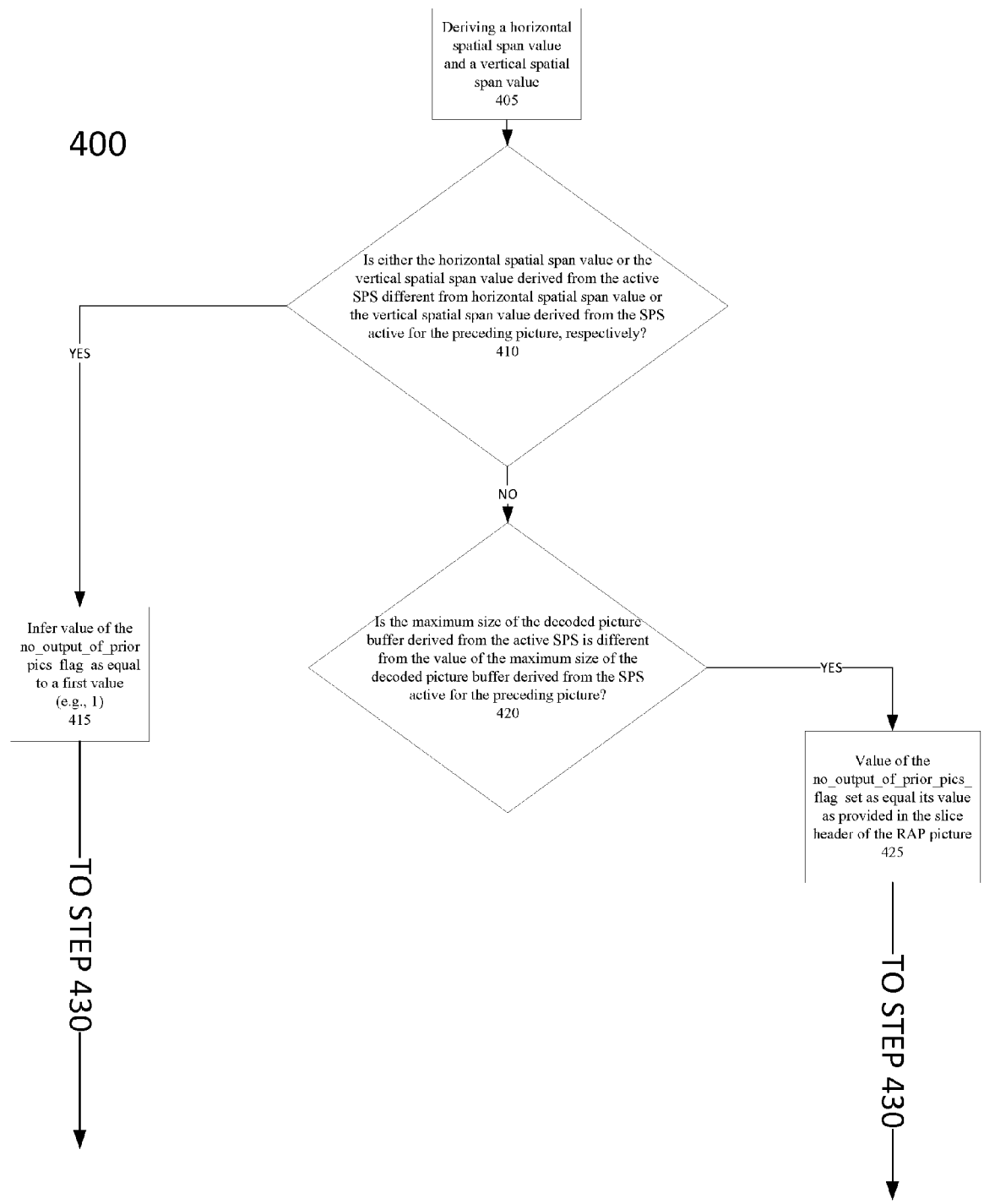
FIGS. 4A-4B are a flowchart illustrating embodiments of the present disclosure.
Figure 4B:
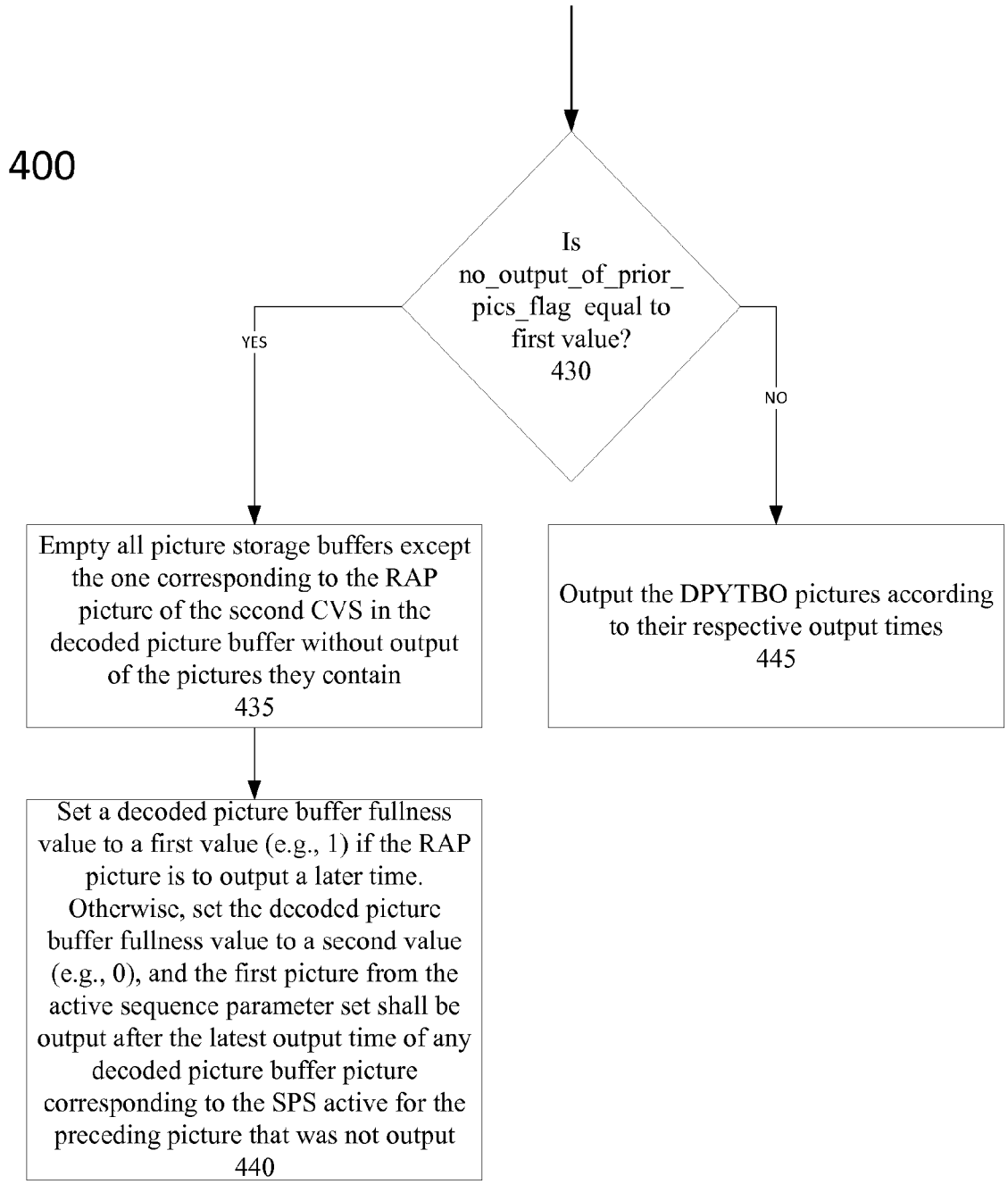

FIGS. 4A-4B illustrate a flowchart embodying methods of the present disclosure. Method 400 is a method for determining the value of the no_output_of_prior_pics_flag when the fixed picture rate flag value is the same (e.g., 1) for all CVSes in the bitstream. Method 400 is a method of determining the value of the no_output_of_prior_pics_flag at the second CVS of two consecutive CVSes, where an active bitstream may include CVSes only with a fixed picture rate, as indicated by the value of the fixed picture rate flag in the SPS of the corresponding CVS.

Method 400 may begin at step 405 where a horizontal spatial span value and a vertical spatial span value may be derived. For example, the horizontal spatial span value may be derived as an output picture width in luma samples value adjusted by a sample aspect ratio and a derived value of sample scale factor. The vertical spatial span value may be derived as an output picture height in luma samples value adjusted by the derived value of sample scale factor.

Method 400 may proceed to step 410 where it may be determined if either the horizontal spatial span value or the vertical spatial span value derived from the active SPS is different from the value of horizontal spatial span value or the vertical spatial span value derived from the SPS active for the preceding picture, respectively.

If at step 410 it is determined that either the horizontal spatial span value or the vertical spatial span value derived from the active SPS is different from the value of horizontal spatial span value or the vertical spatial span value derived from the SPS active for the preceding picture, method 400 may proceed to step 415 where the value of the no_output_of_prior_pics_flag may be inferred as equal to a first value (e.g., 1).

If at step 410 it is determined that neither the horizontal spatial span value nor the vertical spatial span value derived from the active SPS is different from the value of horizontal spatial span value or the vertical spatial span value derived from the SPS active for the preceding picture, method 400 may proceed to step 420 where it may be determined that the maximum size of the decoded picture buffer derived from the active SPS is different from the value of the maximum size of the decoded picture buffer derived from the SPS active for the preceding picture.

If at step 420 it is determined that the maximum size of the decoded picture buffer derived from the active SPS is different from the value of the maximum size of the decoded picture buffer derived from the SPS active for the preceding picture the value of the no_output_of_prior_pics_flag shall not be inferred and method 400 may proceed to step 425.

At step 425 the value of the no_output_of_prior_pics_flag will equal its value as provided in the slice header of the RAP picture. Once the value of the no_output_of_prior_pics_flag is determined, method 400 proceeds to step 435 if it is determined at step 430 that the no_output_of_prior_pics_flag value is determined as the first value (e.g., 1). At step 435, all picture storage buffers except the one corresponding to the RAP picture of the second CVS in the decoded picture buffer may be emptied without output of the pictures they contain.

Method 400 may then advance to step 440, where a decoded picture buffer fullness value may be set to a first value (e.g., 1) if the RAP picture is to output a later time. Otherwise, the decoded picture buffer fullness value may be set to a second value (e.g., 0), and the first picture from the active sequence parameter set shall be output after the latest output time of any decoded picture buffer picture corresponding to the SPS active for the preceding picture that was not output.

Once the value of the no_output_of_prior_pics_flag is determined, method 400 proceeds to step 445 if the no_output_of_prior_pics_flag value is the second value (e.g., 0) at step 430. At step 445, the DPYTBO pictures may be output according to their respective output times.

Although the description has been described with respect to particular embodiments thereof, these particular embodiments are merely illustrative, and not restrictive. For example, although a specific application has been described, it is possible to adapt features of the disclosed embodiments for other applications. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit the invention to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

We claim:

1. A method comprising:
receiving a bitstream including a plurality of coded video sequences (CVS) including at least a first CVS with at least a first picture with a fixed picture rate and a second CVS with at least a second picture without a fixed picture rate, wherein the first CVS and the second CVS are consecutive, wherein a slice header of each slice corresponding to a random access point (RAP) picture includes an no_output_of_prior_pics_flag that signals whether or not to output decoded pictures yet to be output (DPYTBO) pictures;
transitioning to the second CVS from the first CVS, wherein the second CVS has a different picture format than the first CVS; and
determining whether or not to output the DPYTBO pictures corresponding to the first CVS based on the no_output_of_prior_pics_flag;
determining a value of the no_output_of_prior_pics_flag wherein determining a value of the no_output_of_prior_pics_flag comprises:
deriving a horizontal spatial span value of a RAP picture in the second CVS from an output picture width, a sample aspect ratio, and a derived value of sample scale factor,
deriving a vertical spatial span value of the RAP picture in the second CVS from an output picture height, and the derived value of sample scale factor,
inferring the value of the no_output_of_prior_pics_flag as a first value if the horizontal spatial span value or the vertical spatial span value of the RAP picture differs from a horizontal spatial span value or a vertical spatial span value respectively derived in the first CVS,
inferring the value of the no_output_of_prior_pics_flag as the first value if a fixed picture rate is set for either of the first CVS or the second CVS,
obtaining the value of the no_output_of_prior_pics_flag from a slice header of the RAP picture if a size of a decoded picture buffer changes from the first CVS or the second CVS, and
emptying all picture storage buffers except the one corresponding to the RAP picture in the decoded picture buffer without output of the pictures the picture storage buffers contain if the value of the no_output_of_prior_pics_flag is the first value;
setting a decoded buffer fullness value if the RAP picture is output at a later time, and a first picture from an active sequence parameter set shall be output after the latest output time of any decoded picture buffer picture corresponding to the sequence parameter set active for the first CVS that was not output if the value of the value of the no_output_of_prior_pics_flag is the first value; and
outputting the DPYTBO pictures according to their respective output times if the value of the no_output_of_prior_pics_flag is a second value different from the first value has been inserted.

2. The method of claim 1, further comprising determining whether or not to output the DPYTBO pictures based on the no_output_of_prior_pics_flag and an output picture cropping rectangle.

3. The method of claim 2, further comprising cropping a decoded picture after the decoded picture has been scaled according to the derived value of sample scale factor to obtain a final output picture corresponding to the decoded picture, wherein cropping parameters are defined by the output picture cropping rectangle.

4. The method of claim 2, further comprising cropping a decoded picture prior to scaling the decoded picture according to the derived value of sample scale factor to obtain a final output picture corresponding to the decoded picture.

5. The method of claim 1, further comprising ignoring the no_output_of_prior_pics_flag when the RAP picture does not correspond to a first picture of the second CVS.

6. The method of claim 1, further comprising not including the no_output_of_prior_pics_flag when the RAP picture does not correspond to a first picture of the second CVS.

7. A system comprising:
a memory; and
a processor configured to execute code stored in the memory, the code comprising:
receiving a bitstream including a plurality of coded video sequences (CVS) including at least a first CVS with at least a first picture with a fixed picture rate and a second CVS with at least a second picture without a fixed picture rate, wherein the first CVS and the second CVS are consecutive, wherein a slice header of each slice corresponding to a random access point (RAP) picture includes a no_output_of_prior_pics_flag that signals whether or not to output decoded pictures yet to be output (DPYTBO) pictures;
transitioning to the second CVS from the first CVS, wherein the second CVS has a different picture format than the first CVS;
determining whether or not to output the DPYTBO pictures corresponding to the first CVS based on the no_output_of_prior_pics_flag;
determining a value of the no_output_of_prior_pics_flag wherein determining a value of the no_output_of_prior_pics_flag comprises:
deriving a horizontal spatial span value of a RAP picture in the second CVS from an output picture width, a sample aspect ratio, and a derived value of sample scale factor,
deriving a vertical spatial span value of the RAP picture in the second CVS from an output picture height, and the derived value of sample scale factor,
inferring the value of the no_output_of_prior_pics_flag as a first value if the horizontal spatial span value or the vertical spatial span value of the RAP picture differs from a horizontal spatial span value or a vertical spatial span value respectively derived in the first CVS, inferring the value of the no_output_of_prior_pics_flag as the first value if a fixed picture rate is set for either of the first CVS or the second CVS, obtaining the value of the no_output_of_prior_pics_flag from a slice header of the RAP picture if a size of a decoded picture buffer changes from the first CVS or the second CVS, and emptying all picture storage buffers except the one corresponding to the RAP picture in the decoded picture buffer without output of the pictures the picture storage buffers contain if the value of the no_output_of_prior_pics_flag is the first value;

setting a decoded buffer fullness value if the RAP picture is output at a later time, and a first picture from an active sequence parameter set shall be output after the latest output time of any decoded picture buffer picture corresponding to the sequence parameter set active for the first CVS that was not output if the value of the value of the no_output_of_prior_pics_flag is the first value; and outputting the DPYTBO pictures according to their respective output times if the value of the no_output_of_prior_pics_flag is a second value different from the first value.

8. The system of claim 7, further comprising determining whether or not to output the DPYTBO pictures based on the no_output_of_prior_pics_flag and an output picture cropping rectangle.

9. The system of claim 8, further comprising cropping a decoded picture after the decoded picture has been scaled according to the derived value of sample scale factor to obtain a final output picture corresponding to the decoded picture, wherein cropping parameters are defined by the output picture cropping rectangle.

10. The system of claim 8, further comprising cropping a decoded picture prior to scaling the decoded picture according to the derived value of sample scale factor to obtain a final output picture corresponding to the decoded picture.

11. The system of claim 7, further comprising ignoring the no_output_of_prior_pics_flag when the RAP picture does not correspond to a first picture of the second CVS.

12. The system of claim 7, further comprising not including the no output of prior pics flag when the RAP picture does not correspond to a first picture of the second CVS.

* * * * *